United States Patent
Oroskar et al.

(10) Patent No.: US 10,021,606 B1
(45) Date of Patent: Jul. 10, 2018

(54) DISABLING RELAY BASE STATION HANDOVER BASED ON SERVING BASE STATION CAPABILITIES

(71) Applicant: Sprint Spectrum L.P., Overland Park, KS (US)

(72) Inventors: Siddharth S. Oroskar, Overland Park, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 241 days.

(21) Appl. No.: 15/163,427

(22) Filed: May 24, 2016

(51) Int. Cl.
   H04W 36/00 (2009.01)
   H04W 24/10 (2009.01)
   H04W 8/26 (2009.01)
   H04W 36/30 (2009.01)
   H04W 36/38 (2009.01)
   H04B 7/155 (2006.01)

(52) U.S. Cl.
   CPC .... *H04W 36/0088* (2013.01); *H04B 7/15507* (2013.01); *H04W 8/26* (2013.01); *H04W 24/10* (2013.01); *H04W 36/30* (2013.01); *H04W 36/38* (2013.01)

(58) Field of Classification Search
   None
   See application file for complete search history.

(56) References Cited

U.S. PATENT DOCUMENTS

| | | | | |
|---|---|---|---|---|
| 8,660,563 B2 * | 2/2014 | Lee | ....................... | H04W 36/30 370/331 |
| 8,825,040 B2 * | 9/2014 | Hooli | .................... | H04W 72/02 455/422.1 |
| 9,265,047 B2 * | 2/2016 | Mallik | .................. | H04W 24/02 |
| 2012/0100855 A1 * | 4/2012 | Zhang | .................. | H04B 7/155 455/436 |
| 2012/0309291 A1 * | 12/2012 | Sawai | ................ | H04B 7/15542 455/7 |
| 2014/0016537 A1 * | 1/2014 | Khobare | ............... | H04W 36/30 370/315 |
| 2015/0236777 A1 * | 8/2015 | Akhtar | ............... | H04B 7/15528 455/438 |

* cited by examiner

*Primary Examiner* — Shantell L Heiber

(57) ABSTRACT

A method and system for disabling handover of a wireless communication device (WCD) that is acting as a relay WCD in relay base station. The relay WCD may receive from its serving base station a parameter message including one or more sets of handover threshold parameter values, where the relay WCD compares measurements of power received from one or more base stations with one or more handover threshold values to determine if a condition is met for sending receive-power measurement messages to the serving base station. Based on the one or more sets of handover threshold values, the relay WCD may infer what capability the serving base station has for distinguishing between relay WCDs and non-relay WCDs. Based on the inference, the relay WCD may control its reporting to the serving base station of receive-power measurement reports relating to the one or more sets of handover threshold values.

20 Claims, 8 Drawing Sheets

DISABLING RELAY BASE STATION HANDOVER BASED ON SERVING BASE STATION CAPABILITIES

BACKGROUND

A typical wireless network includes a number of base stations each radiating to provide coverage in which to serve wireless communication devices (WCDs) such as cell phones, tablet computers, tracking devices, embedded wireless modules, and other wirelessly equipped devices. In turn, each base station may be coupled with network infrastructure that provides connectivity with one or more transport networks, such as the public switched telephone network (PSTN) and/or the Internet for instance. With this arrangement, a WCD within coverage of the network may engage in air interface communication with a base station and may thereby communicate via the base station with various remote network entities or with other WCDs served by the base station.

Depending on the specific underlying technologies and architecture of a given wireless communication network, base stations may take different forms. In a code division multiple access (CDMA) system configured to operate according IS-2000 and IS-856 standards, for example, a base station may include a base transceiver system (BTS) under the control of a base station controller (BSC). In a universal mobile telecommunications system (UMTS) configured to operate according to ITU IMT-2000 standards, the base station is usually referred to as a NodeB, and is usually under the control of a radio network controller (RNC). In a UMTS network configured to operate to Long Term Evolution (LTE) standards, evolved NodeBs (eNodeBs) may communicate directly with one another, while under functional coordination of a mobility management entity (MME). Other base station architectures and operational configurations are possible as well.

Further, a wireless network may operate in accordance with a particular air interface protocol (i.e., radio access technology), with communications from the base stations to WCDs defining a downlink or forward link and communications from the WCDs to the base stations defining an uplink or reverse link. Examples of existing air interface protocols include, without limitation, wireless wide area network (WWAN) protocols such as Orthogonal Frequency Division Multiple Access (OFDMA (e.g., Long Term Evolution (LTE) and Wireless Interoperability for Microwave Access (WiMAX)), Code Division Multiple Access (CDMA) (e.g., 1xRTT and 1xEV-DO), and Global System for Mobile Communications (GSM), and wireless local area network (WLAN) protocols such as IEEE 802.11 (WIFI), BLUETOOTH, and others. Each protocol may define its own procedures for registration of WCDs, initiation of communications, handover or handoff between coverage areas, and other functions related to air interface communication.

In practice, a base station, such as an eNodeB, may be configured to provide service to WCDs on multiple carrier frequencies or "carriers." Each carrier could be a time division duplex (TDD) carrier that defines a single frequency channel multiplexed over time between downlink and uplink use, or a frequency division duplex (FDD) carrier that defines two separate frequency channels, one for downlink communication and one for uplink communication. Each frequency channel of a carrier may then occupy a particular frequency bandwidth (e.g., 1.4 MHz, 3 MHz, 5 MHz, 10 MHz, or 20 MHz) defining a range of frequency at a particular position (e.g., defined by a center frequency) in a radio frequency band (e.g., in the 800 MHz band, the 1.9 GHz band, or the 2.5 GHz band).

Each carrier may also define various logical channels to facilitate communication between the base station and one or more served WCDs. For instance, on the downlink, a carrier may define a reference channel on which the base station broadcasts a reference signal useable by WCDs to detect and evaluate coverage, various other downlink control channels to carry control signaling (such as resource-scheduling directives) to WCDs, and one or more shared or traffic channels for carrying bearer data (e.g., user or application level data) to WCDs. And on the uplink, a carrier may define one or more uplink control channels to carry control signaling (such as resource scheduling requests, channel state reports, and the like) from WCDs, and one or more shared or traffic channels for carrying bearer data from WCDs. In practice, the shared or traffic channels may define particular physical resources for carrying data between the base station and WCDs.

When a WCD enters into coverage of a base station, the WCD may attach, register, or otherwise associate with the base station, and the base station may then serve the WCD on one or more carriers. The base station may then be referred to as the WCD's "serving" base station. Herein, the term "serving" will, in general, be used to describe a particular base station as such only when it is not otherwise apparent from context. In practice, the process of serving the WCD may involve the serving base station allocating use of particular air interface resources, such as traffic channels or portions thereof, to carry data communications to and from the WCD, and managing transmission on those resources, such as controlling what modulation scheme is used for the transmissions.

For instance, when the serving base station has data to transmit to the WCD, the serving base station may select certain downlink resources to carry the data and may determine a modulation scheme for transmission on those resources, and the base station may then (i) transmit to the WCD a scheduling directive instructing the WCD to receive the data on the scheduled resources using the determined modulation scheme, and (ii) transmit the data on the indicated downlink resources using the determined modulation scheme. Likewise, when the serving base station receives from the WCD a request for the WCD to transmit data to the base station, the base station may select certain uplink resources to carry the data and may determine a modulation scheme for transmission on those resources, and the base station may then (i) transmit to the WCD a scheduling directive instructing the WCD to transmit the data on the scheduled resources using the determined modulation scheme and (ii) receive the transmission from the WCD accordingly.

A WCD may also move between neighboring coverage areas of base stations. More specifically, as a WCD moves between wireless coverage areas of a wireless communication system, or when network conditions change or for other reasons, the WCD may "handover" (or "hand off") from operating in one coverage area (e.g., a serving coverage area) to operating in another coverage area. In a usual case, this handover process is triggered by the WCD monitoring the signal strength of various nearby available coverage areas, and the serving base station (or some other controlling network entity) determining when one or more threshold criteria are met. For instance, a WCD may continuously monitor signal strength from various available coverage areas and notify its serving base station when a given coverage area has a signal strength that is sufficiently higher than that of the serving base station. The serving base station (or some other controlling network entity) may then direct the WCD to handover to the base station of the given coverage area. By convention, a WCD is said to handover from a "source" base station (or source coverage area) to a "target" base station (or target coverage area). At the time that a handover is triggered, the source base station is the WCD's serving base station.

OVERVIEW

Communications from a base station to a WCD are carried on a "forward link" (e.g., in a CDMA system) or "downlink" (e.g., in a UMTS/LTE network) of an air interface between the WCD and base station, and communications from a WCD to the base station are carried on "reverse link" (e.g., in a CDMA system) or "uplink" (e.g., in a UMTS/LTE network) of the air interface. By way of example, the discussion herein will be made with reference to LTE, and the terms downlink and uplink will therefore be adopted. However, it should be understood that discussion applies as well to forward and reverse links. As noted above, an LTE base station may take the form of an eNodeB.

Some wireless communication networks (e.g., under LTE) support one or another form of "relay base station" in which a WCD (possibly in conjunction with an auxiliary application or device) can function as a small base station for other WCDs within its wireless range. The WCD of a relay base station is referred to as a "relay WCD." In such a case, instead of having a dedicated backhaul link to the wireless network, the relay base station has a wireless backhaul supported by, or overlaid on, an air interface connection between its relay WCD and the relay WCD's serving base station. Thus, for a relay base station, the types of traffic usually supported on "backhaul" connections between a base station and the network are supported on the wireless backhaul.

Because the air interface connection between a relay WCD and its serving base station supports the wireless backhaul for the relay base station, performance of the relay base station in serving other WCDs depends, in part, on the level of service and stability provided by its air interface. One aspect of operation that can impact performance of a relay base station in this regard is handover of the relay WCD from its serving base station to a different (target) base station. In particular, handover of a relay WCD can be disruptive to the wireless backhaul of the relay base station, both in terms of delay that may be introduced by the handover procedure, as well as overhead involved in switching the air interface endpoints of the wireless backhaul (i.e., from the source to the target base station). Yet a relay WCD may be subject to the same types of changes and/or shifts in operating conditions that cause other, non-relay WCDs to engage in handovers.

More specifically, WCDs typically monitor the signal strength of their respective serving base stations and that of other nearby base stations (e.g., in a "neighbor list") to determine if and when conditions for a handover may arise. In practice, a WCD's serving base station may provide the WCD with a set of handover threshold parameters that define one or more power levels against which the WCD can compare measurements of signal power received from nearby base stations, including the WCD's serving base station. The WCD may then report signal-power measurements to its serving base station, depending on the results of one or another of the comparisons. The serving base station, in turn, can then initiate handover of the WCD to a different base station as may be warranted by the reported signal-power measurements.

In conventional operation, the actions of a relay WCD in response to receiving a parameter message including a set of handover threshold parameters are the same as any non-relay WCD. Namely, to monitor received signal power and report the results to its serving base station if comparison with one or another threshold indicates that a reporting message should be sent. The relay WCD may then be subject to handover based on the serving base station's evaluation of the received signal-strength reporting message.

One approach to helping avoid handover of relay WCDs based on reported signal-strength measurements is for serving base stations to disable handover of relay WCDs. However, a wireless communication system deployment may typically include at least some base stations that lack the capability to disable handover on a per-WCD basis, making it difficult to do so across the entire system (or possible across more than one wireless communication system) for relay WCDs. Another approach is to disable signal-strength reporting for relay WCDs. However, not all information in a signal-strength reporting message will necessarily trigger a handover, and some non-triggering information may be useful to the serving base station for purposes other than handover. For example, some aspects of resource allocation may benefit from non-triggering information in signal-strength reporting messages. Thus, disabling all such reporting could deprive a serving base station of useful information.

For these and other related reasons, it would be desirable to maintain a relay WCD's ability to send signal-strength reporting messages to its serving base station, while avoiding triggering handovers in instances where the serving base station does not or cannot selectively disable handovers. Disclosed herein is a method and system for achieving these and other desirable goals by adapting the operation of relay WCDs to enable them to discern, infer, or determine the capabilities of their respective serving base stations with respect to handovers, and to adapt their behavior with respect to signal-power reporting accordingly.

Hence, in one respect, various embodiments of the present invention provide, in a relay base station comprising a relay wireless communication device (WCD) receiving service from a serving base station of a wireless communication network over an air interface, a method comprising: the relay WCD receiving a parameter message including one or more sets of handover threshold parameter values from the serving base station over the air interface, wherein the relay WCD compares measurements of power received in reference signals from one or more base stations with one or more handover threshold values to determine if one or more conditions are met for sending receive-power measurement messages to the serving base station; based on the one or more sets of handover threshold values in the received message, the relay WCD making an inference of what capability the serving base station has for distinguishing between relay WCDs and non-relay WCDs from among WCDs served by the serving base station; and based on the inference, the relay WCD controlling its reporting to the serving base station of receive-power measurement reports relating to the one or more sets of handover threshold values.

In another respect, various embodiments of the present invention provide a relay base station comprising a relay wireless communication device (WCD) for receiving service from a serving base station of a wireless communication network over an air interface, the relay wireless communication device WCD comprising: an air interface for wireless communications with one or more base stations; one or more processors; memory accessible by the one or more processors; and machine-readable instructions stored in the memory, that upon execution by the one or more processors cause the relay WCD to carry out operations including: receiving a parameter message including one or more sets of handover threshold parameter values from the serving base station over the air interface, wherein the relay WCD compares measurements of power received in reference signals from one or more base stations with one or more handover threshold values to determine if one or more conditions are met for sending receive-power measurement messages to the serving base station, based on the one or more sets of handover threshold values in the received message, making an inference of what capability the serving base station has for distinguishing between relay WCDs and non-relay WCDs from among WCDs served by the serving base station, and based on the inference, controlling reporting to the serving base station of receive-power measurement reports relating to the one or more sets of handover threshold values.

In still another respect, various embodiments of the present invention provide, in a base station of a wireless communication network, a method comprising: making a determination that a particular wireless communication device (WCD) of one or more WCDs being served by the base station is a relay WCD of a relay base station; based on the determination, sending to the relay WCD a parameter message including a plurality of sets of handover threshold parameter values, at least one of the sets being associated with a public land mobile network (PLMN) designated for relay WCDs, and at least one other set being associated with a PLMN designated for non-relay WCDs, wherein handover threshold values are used by WCDs to determine if one or more conditions are met for sending receive-power measurement messages to their respective serving base station; subsequent to sending the parameter message, receiving a receive-power measurement message from the relay WCD, the receive-power measurement message including information comparing power received by the relay WCD from one or more base stations with one or more handover threshold values of the set associated with the PLMN designated for relay WCDs; and omitting the information included in the received receive-power measurement message from a determination of whether or not to initiate a handover of the relay WCD.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and apparatus will be described herein in the context of LTE as an example air interface protocol and associated network arrangement. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
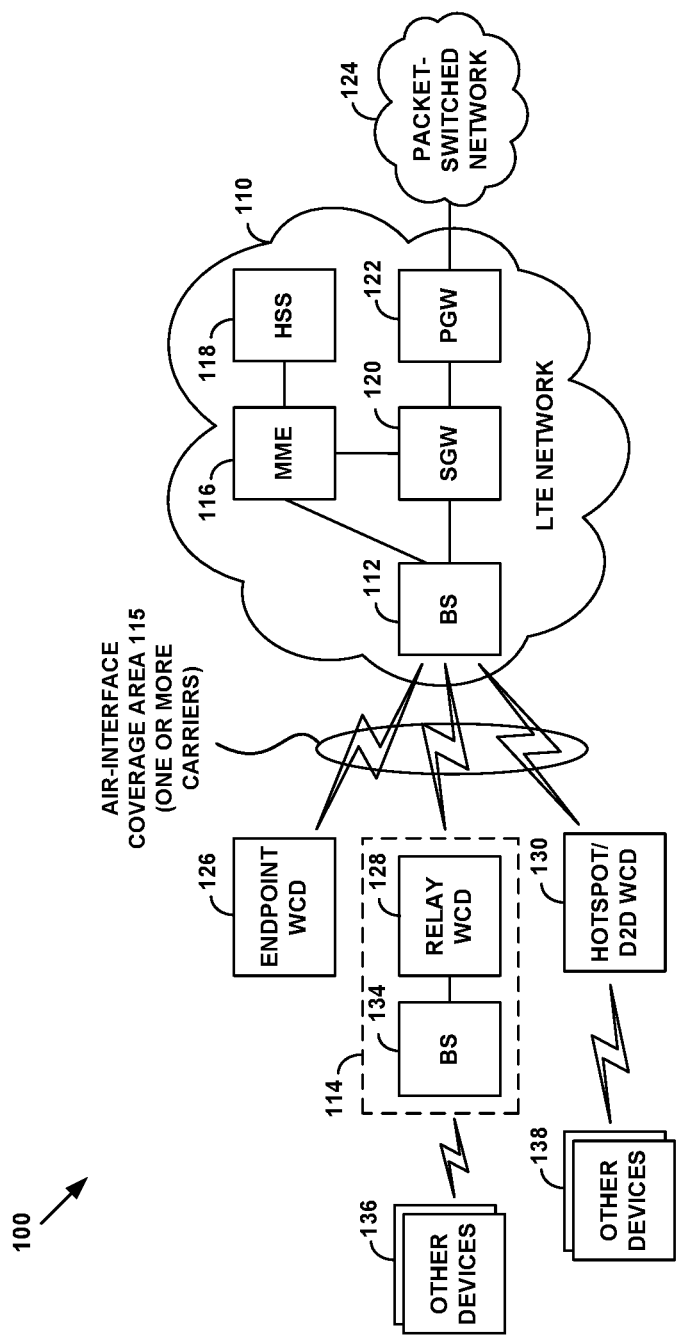
FIG. 1 is a simplified block diagram of a wireless communication system in which the present method and system can be implemented.

Referring to the drawings, FIG. 1 is a simplified block diagram of a wireless communication system 100 in which the present method and system can be implemented. In particular, FIG. 1 depicts a representative LTE network 110, which functions primarily to serve WCDs with wireless packet data communication service, including possibly voice-over-packet service, but may also provide other functions. As shown, the LTE network 110 includes a base station (LTE eNodeB) 112, which has an antenna structure and associated equipment for providing an LTE coverage area 115 in which to serve the WCDs. The base station 112 then has a communication interface with a mobility management entity (MME) 116 that functions as a signaling controller for the LTE network 110 and has a communication interface with a home subscriber server (HSS) 118. Further, the base station 112 has a communication interface with a serving gateway (SGW) 120, which in turn has a communication interface with a packet-data-network gateway (PGW) 122 that provides connectivity with a packet-switched network 124 such as the Internet, and the MME 118 has a communication interface with the SGW 120. In practice, the illustrated components of the LTE network 110 may sit as nodes on a private packet-switched network owned by an operator of the LTE network 110, and thus the various communication interfaces may be logical interfaces within that network.

In addition, FIG. 1 illustrates three example WCDs 126, 128, 130 being served by the base station 112 over air interface 115 (e.g., within a particular coverage area of the base station). WCD 126 is typical end-user WCD such as a cell phone or wirelessly-equipped computer, tablet, or other device that does not provide connectivity for at least one other device. WCDs 128 and 130, on the other hand, are WCDs that provide connectivity for at least one other device. In particular, WCD 128 is connected, configured, or otherwise arranged as a relay WCD coupled or integrated with a small cell base station (also referred to as a "mini-macro base station") 134 or the like in a relay base station 114, that is in turn configured (similar to base station 112) to serve other devices 136. As such, WCD 128 functions as an intermediary between base station 112 and any devices served by small cell base station 134, with the air interface connection between WCD 128 and base station 112 functioning as a wireless backhaul link for the small cell base station 134. And WCD 130 is configured as a hotspot or device-to-device (D2D) WCD (such as a cell phone having a personal-hotspot feature), similar to the relay WCD, to function as an intermediary between base station 112 and one or more other devices 138. In these configurations, the base station 112 is sometimes referred to as a "donor" base station.

In practice, when any such WCD enters into coverage of base station 112, the WCD may engage in a process to attach with, handover to, or otherwise associate with the base station, which may result in establishment of a radio link layer connection (e.g., radio resource control (RRC) connection) over the air between the WCD and the base station and preparation of the network to facilitate serving the WCD. For instance, the WCD may transmit an attach request to the base station, which the base station may forward to the MME, and the MME may then engage in signaling to control setup of one or more bearers for carrying data for the WCD between the PGW and the base station. The base station 112 may also establish a tunnel ("S1-U" tunnel in LTE) to the SGW 120 for the WCD, as well as for other served WCDs. Further, in this attach process, the WCD may convey to the base station information about the WCD's profile and configuration, and the MME may also receive WCD profile and configuration information from the HSS and convey that information to the base station, and the base station may store this information in a local context record for the WCD.

The base station may then serve the WCD, scheduling downlink and uplink communications as discussed above for instance. In particular, if the base station receives from the SGW data to be transmitted to the WCD, the base station may schedule and engage in transmission of the data to the WCD using an appropriate modulation scheme. And if the WCD requests transmission of data to the base station, the base station may schedule transmission of the data from the WCD using an appropriate modulation scheme, and the WCD may transmit the data accordingly.

Further, if a WCD provides connectivity for one or more other devices, the radio link layer connection between the WCD and the base station 112 may also carry signaling and bearer data related to each such other device. For instance, considering relay WCD 128, the small cell base station 134 may operate as a base station of the LTE network, but its communications with other entities in the LTE network (such as with an SGW and MME) would occur via the relay WCD 128 and via the radio link layer connection between the relay WCD 128 and the base station 112. Thus, when data is to be transmitted from the LTE network to a device served by the small cell base station 134, base station 112 would schedule and transmit that data over the air to the relay WCD 128, the relay WCD 128 would then pass the data to the small cell base station 134, and the small cell base station 134 would then schedule and transmit the data over the air to the served device. Likewise, when a device served by the small cell base station 134 transmits data to the small cell base station 134 for transmission on the packet-switched network 124, the small cell base station 134 would then pass the data to the relay WCD 128, and the relay WCD 128 would then work with base station 112 to facilitate transmission of the data over the air to base station 112. A similar but simpler arrangement may apply as well with a hotspot/D2D WCD.

The LTE network 110 is an example of a "radio access network" ("RAN") that may be deployed by a wireless service provider. In general, a wireless service provider may operate one or more RANs, such as the LTE RAN 110, as a "public land mobile network" ("PLMN") for serving WCDs (or other mobile terminals) that subscribe to service of the provider. For example, a service provider may operate an LTE RAN as an LTE PLMN and may provide WCDs with subscriptions that allow the terminals to receive LTE service from that PLMN. As another example, a service provider may operate a CDMA RAN as a CDMA PLMN and may provide WCDs with subscriptions that allow the terminals to receive CDMA service from that PLMN. And as another example, a service provider may operate both an LTE PLMN and a CDMA PLMN and may provide WCDs with subscriptions that allow the WCDs to receive both LTE service from the LTE PLMN and CDMA service from the CDMA PLMN.

In practice, a RAN operating as a PLMN may have an associated PLMN identifier (PLMN ID), and base stations of the RAN may be arranged to broadcast that PLMN ID to indicate that the base stations are part of that PLMN. WCDs that subscribe to service of a wireless service provider's PLMN may then be provisioned with data indicating the PLMN ID of the PLMN and with logic that causes the WCDs to prefer service by base stations broadcasting that PLMN ID. Further, WCDs that subscribe to service of multiple PLMNs, such as both an LTE PLMN and a CDMA PLMN may be provisioned with data indicating the PLMN IDs of each such PLMN and with logic that causes the WCDs to prefer service by base stations broadcasting one or more of those PLMN IDs.

A wireless service provider may also allow one or more of its PLMNs to serve WCDs that subscribe to service of other PLMNs, pursuant to a roaming agreement. In particular, a first wireless service provider providing a first PLMN may enter into a roaming agreement with a second wireless service provider providing a second PLMN, according to which the first PLMN will serve WCDs that subscribe to the second PLMN, and the second wireless service provider will compensate the first service provider for providing that service. As such, a given WCD that subscribes to service of the second PLMN but that is not within sufficient coverage of the second PLMN may instead opt to be served by the first PLMN, in which case the given WCD is said to be "roaming" in the first PLMN. The second wireless service provider may also provide reciprocal roaming service to WCDs that subscribe to service of the first PLMN.

As discussed briefly above, a serving base station will typically provide a served WCD with a set of signal-power thresholds against which the WCD can compare measured received power levels from one or more nearby base stations, including its serving base station, in order to determine if and when conditions for a handover arise. More particularly, base stations periodically transmit respective pilot signals, or other reference signal, that may include respective identifying information. A WCD detecting a pilot signal may then identify the transmitting base station, and measure the strength of the signal. For example, the WCD may measure power of the received signal in logarithmic units of decibels (dB) relative to reference level, where any two power levels $P_0$ and $P_1$ are related by x dB=10 $\log_{10}$ ($P_1/P_0$). Other measures of signal strength may be used as well.

In conventional operation, the base station provides the thresholds by transmitting a parameter message that contains a set of handover threshold parameter values. The WCD then monitors received signal-power and compares its measurements with one or more of the thresholds to decide if and when it should transmit a measurement report to the serving base station. The serving base station then evaluates the reported signal levels to determine if a handover of the WCD to a different base station is warranted. If so, the serving base station may then initiate a handover.

By way of example, an LTE base station, such as the base station 112 in FIG. 1, may transmit to a served WCD a parameter message containing a set of "A-parameters," which establish trigger points for the WCD's operation. Table 1 shows a set of A-parameters that may be used to define handover-related events.

TABLE 1

| | |
|---|---|
| S-measure comparing | Serving base station signal strength below which WCD begins received signals with other handover thresholds |
| A1 event | Serving base station signal strength is greater than an A1 threshold |
| A2 event | Serving base station signal strength is less than an A2 threshold |
| A3 event | Neighboring base station signal is greater than serving base station signal by an offset |
| A4 event | Neighboring base station signal strength is greater than an A4 threshold |
| A5 event | Serving base station signal strength is less than a first A5 threshold while a neighboring base station signal strength is greater than a second A5 threshold |

The parameter message from the serving base station provides the WCD with values for the S-measure and A1-A5 parameters, and the WCD then operates in accordance with the values. For example, the WCD will not monitor signal strength of nearby (neighboring) base stations unless the signal strength of its serving base station falls below the S-measure value. Once this occurs, the WCD will monitor for one or more of the A1-A5 events, and report them to the serving base station as they may arise. The serving base station may then invoke a handover procedure in response to the reported event or events. An A3 event, for instance, may cause the serving base station to initiate a handover. Similarly, the serving base station may initiate handover in response to other reported events or combinations of events.

For a relay WCD that supports a wireless backhaul on its air interface with its serving base station, a handover to a different base station can be disruptive to the wireless backhaul and to one or more WCDs being served by the relay base station via the relay WCD. For example, a handover operation may introduce delay in communications carried on the wireless backhaul. In addition, switching the network-side of a wireless backhaul from the initial serving base station to a new, target base station can incur overhead. Under conventional operation, however, a relay WCD may experience variations in air-interface operating conditions similar to those of other non-relay WCDs. As a result, when a relay WCD operates in accordance with convention in applying a set of handover threshold parameters, such as those illustrated in Table 1, the relay WCD may be subject to handover. It would therefore desirable to avoid or eliminate handovers of relay WCDs in order to help ensure stability and performance of the wireless backhauls they provide.

One possible approach to avoiding handovers of relay WCDs is for the donor (macro) base station, such as base station 112 in FIG. 1, to recognize a WCD as a relay WCD (e.g., WCD 128) and responsively disable handovers for that relay WCD. While this may work with some macro base stations, a typical wireless communication network can include other macro base stations that lack the necessary functionality to differentiate between relay WCD and non-relay WCDs, and to thereby selectively disable handovers. Ensuring that all macro base stations of a service provider's network have the necessary capabilities can therefore require updating all those macro base stations that lack the capabilities. This can be costly, if not impractical. Another approach is to disable signal-strength reporting for all relay WCDs. However, some measurement information in signal-strength reports can be useful for purposes other than handover. For example, some such information may be useful in resource allocation decisions by a donor base station. Accordingly, it would not only be desirable to avoid or eliminate handovers of relay WCDs, but to do so without the need to update base station infrastructure and while preserving useful signal-strength reporting by relay WCDs.

In accordance with example embodiments, a relay WCD will discern, infer, or determine the capabilities of its serving base station with respect to handovers, and will then adapt its behavior with respect to signal-strength reporting so as to ensure that the serving base station will not initiate handover. More specifically, upon receiving a parameter message from its serving base station, a relay WCD will infer from the contents relating to handover thresholds whether the serving base either has the capability to distinguish between relay WCDs and non-relay WCDs. If the inference is that the serving base station can distinguish, then the WCD will send signal-strength reports as in conventional operation, knowing that such reports will not trigger handover. If the inference is that the serving base station cannot distinguish, then the WCD will refrain from sending signal-strength reports, since such reports might trigger handover. In the event that the inference is indeterminate or ambiguous as to the serving base station's ability to distinguish, then the WCD may still engage in transmitting certain signal-strength reports that do not contain measurements that could trigger handover.

The terms "infer" and "discern" are used herein because the form and/or types of handover threshold parameters in a parameter message provide an indication of what the serving base station can or cannot do with respect to distinguishing between relay WCDs and non-relay WCDs. A serving base station that can distinguish will affirmatively indicate as much by sending an appropriate parameter message. On the other hand, a serving base station that cannot distinguish will send a conventional parameter message that effectively serves as a passive indication that the serving base station cannot distinguish. It is up to the relay WCD to recognize the capability of its serving base station by differentiating the contents of parameter messages from both types of serving base stations, and to adapt its operation accordingly, as discussed below. In some instances, the relay WCD may not be able make a definitive determination based on the parameter; operation of the relay WCD in these instances is also discussed below.

Figure 2A:
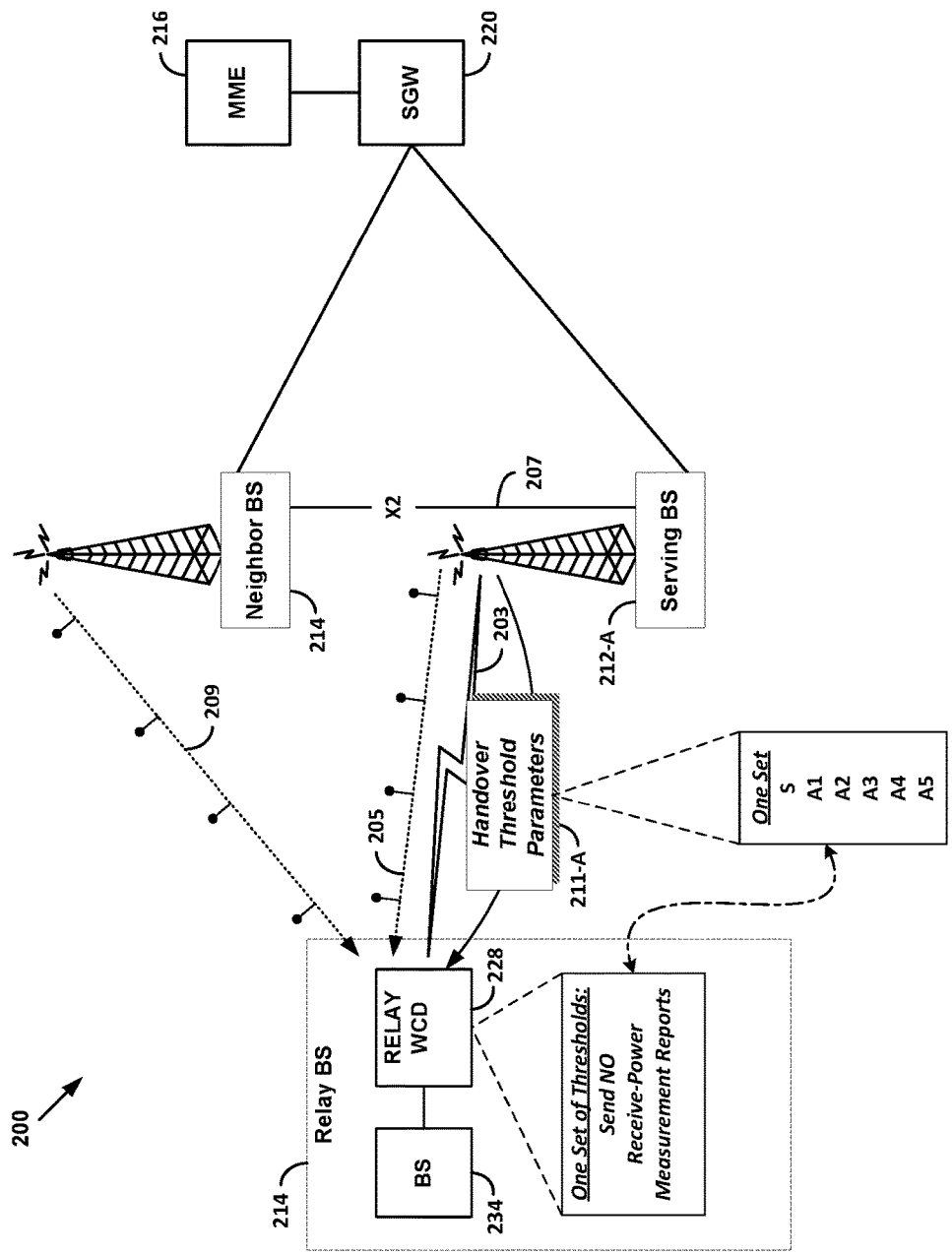
FIG. 2A illustrates example operation in a first example scenario, in accordance with example embodiments.
Figure 2B:
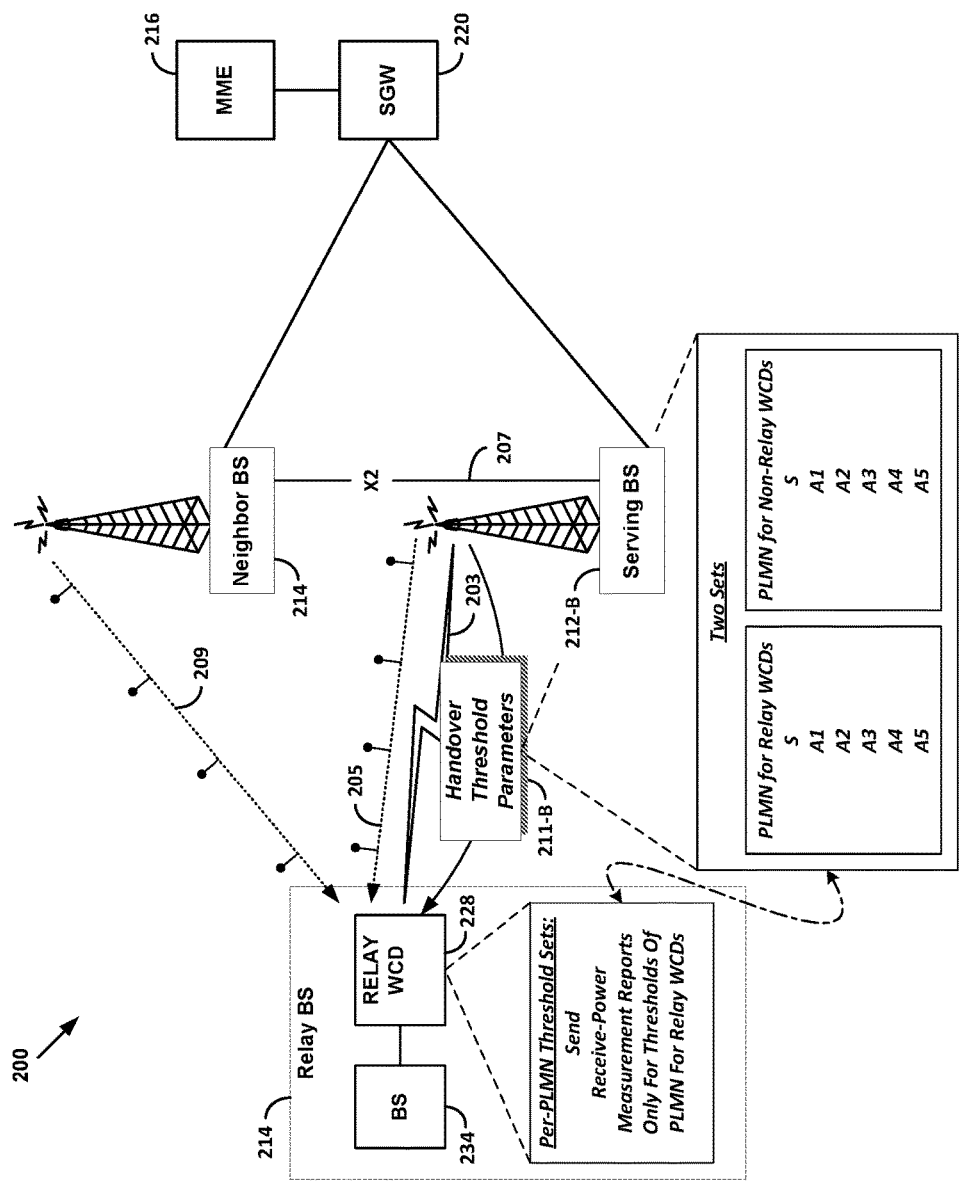
FIG. 2B illustrates example operation in a second example scenario, in accordance with example embodiments.
Figure 2C:
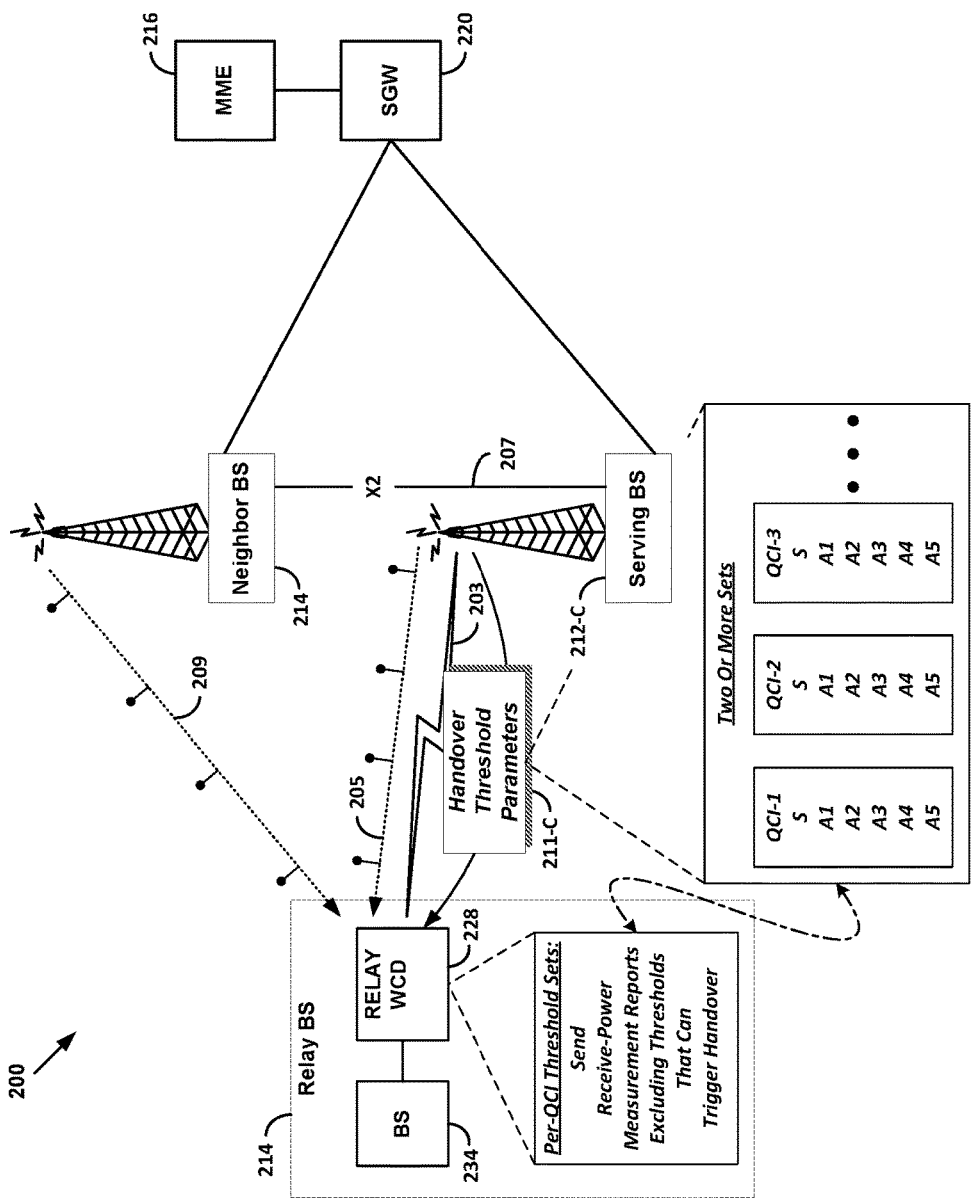
FIG. 2C illustrates example operation in a third example scenario, in accordance with example embodiments.

Example embodiments of disabling handover of a relay WCD by adapting signal-strength reporting of the relay WCD based on handover thresholds from the serving base station can be understood by considering example operation. FIGS. 2A, 2B, and 2C illustrate example operation under three scenarios corresponding respectively a relay WCD's inference of its serving base station's capabilities with respect to distinguishing between relay WCDs and non-relay WCDs. Specifically, FIG. 2A illustrates example operation in an example use case in which a relay WCD infers that its serving base station cannot distinguishing between relay WCDs and non-relay WCDs. FIG. 2B illustrates example operation in an example use case in which a relay WCD infers that its serving base station can distinguishing between relay WCDs and non-relay WCDs. And FIG. 2C illustrates example operation in an example use case in which a relay WCD is unable to definitively determine whether or not its serving base station can distinguishing between relay WCDs and non-relay WCDs.

Each of FIGS. 2A, 2B, and 2C includes wireless network 200 in accordance with example embodiments. By way of example, the wireless network 200 includes a relay base station 214 that includes a relay WCD 228 integrated with, or connected to, a small cell base station or mini-macro base station 234. The relay WCD 228 is served by a serving base station 212-A, 212-B, or 212-C (in FIG. 2A, 2B, or 2C, respectively) over an air interface 203, which supports wireless communications for the WCD 228 and provides a wireless backhaul for the relay base station 214. The network 200 also includes a second, neighbor base station 214. The serving base station 212-A, 212-B, or 212-C and the neighbor base station 214 could be eNodeBs of an LTE network, for example. As such, an interface referred to in LTE as an "X2" interface, provides a direct communicative connection or link between LTE base stations. Thus, the serving base station 212-A, 212-B, or 212-C is connected to the neighbor base station 214 by the X2 link 207. The base stations 212-A, 212-B, or 212-C and 214 are each connected to a SWG 220, which in turn is connected to a MME 216. For the sake of brevity in FIGS. 2A, 2B, and 2C, other LTE network elements, such as those illustrated in FIG. 1 (e.g., HSS and PGW), have been omitted.

As described above, base stations periodically transmit respective pilot signals, or other reference signal, that may include respective identifying information. This is represented in FIGS. 2A, 2B, and 2C as reference signal transmissions 205 from the serving base station 212 A, 212-B, or 212-C and reference signal transmissions 209 from the neighbor base station 214. As a visual cue, reference signal transmissions 205 and 209 each depict a series of "pulses" representing discrete signals (e.g. pilot pulses) in time. In accordance with example embodiments, the relay WCD 228 will adapt its monitoring and reporting of the signal strengths of the received reference signals based on the form of the handover threshold parameters it receives from the serving base station.

Specifically, FIG. 2A illustrates example operation for the use case in which the serving base station 212-A either lacks the capability to distinguish between relay WCDs and non-relay WCDs, or it does not provide the relay WCD 228 with any indication that it has the capability. In this case, the serving base station 212-A transmits to the relay WCD 228 a parameter message 211-A that includes a single set of handover threshold parameter values, as illustrated by the parameter list graphically linked to the parameter message 211-A in FIG. 2A. For example, these parameters could correspond to values S, and A1-A5, as described above. In accordance with example operation in this use case, the relay WCD 228, upon determining that the parameter message contains only a single set of handover threshold parameter values, will infer that the serving base station 212-A cannot distinguish between relay WCDs and non-relay WCDs. Based this inference, the relay WCD 228 will refrain from send (transmitting) any signal-strength reporting messages to the serving base station 212-A, as indicated by the notation graphically linked to the relay WCD 228 in FIG. 2A. Consequently, the relay WCD 228 will not be subject to handovers based on signal-strength measurements.

FIG. 2B illustrates example operation for the use case in which the serving base station 212-B has the capability to distinguish between relay WCDs and non-relay WCDs. In this case, the serving base station 212-B transmits to the relay WCD 228 a parameter message 211-B that includes two sets of handover threshold parameter values, each set associated or "keyed" to a different PLNM ID. In accordance with example embodiments, one PLNM can be designated specifically for relay WCDs and the other can be designated for non-relay (or "all other") WCDs as illustrated by the two parameter lists graphically linked to the parameter message 211-B in FIG. 2B. Each set of parameters could, again, be a distinct set of parameter values S, and A1-A5, as described above. Some (or all) of the values of like parameters in the two sets could be the same, but need not be. The main distinction is that the two sets are keyed to different PLMN IDS. This is an indication to the relay WCD 228 that the serving base station 212-B has the capability to distinguish between relay WCDs and non-relay WCDs.

In further accordance with example operation in this use case, the relay WCD 228, upon determining that the parameter message contains the two sets of handover threshold parameter values, each set keyed to a different PLMN, one of which designated for relay WCDs, will infer that the serving base station 212-B can distinguish between relay WCDs and non-relay WCDs. Based this inference, the relay WCD 228 will carry out usual monitoring and reporting (transmitting) of signal-strength reporting messages to the serving base station 212-B, but using the set handover threshold parameters keyed to the PLMN for relay WCDs. Because the serving base station 212-B recognizes the relay WCD 228 as a relay WCD, it will not initiate any handovers based on received signal-strength measurements, even if the reported signal-strength events would normally call for or warrant a handover. The serving base station 212-B may nevertheless obtain and/or derive useful information from any signal-strength reporting messages from the relay WCD 228. Note that a serving base station, such as serving base station 212-B, could include more than two sets of handover threshold parameter values keyed to different PLMN, as long as one of the PLNMs is designated for relay WCDs. This could still be an indication the to the relay WCD, such as relay WCD 228, that the serving base station can distinguish between relay WCDs and non-relay WCDs.

FIG. 2C illustrates example operation for the use case in which the serving base station 212-C may or may not have the capability to distinguish between relay WCDs and non-relay WCDs, but the relay WCD 228 is unable to make a definitive determination based on the received parameter message. In this case, the serving base station 212-C may transmit to the relay WCD 228 a parameter message 211-C that includes two or more sets of handover threshold parameter values, each set associated or keyed to a different indicator of a type of service, or a quality of service. In accordance with an example embodiment, each different indicator can be a different quality of service class indicator (QCI). Under LTE, a QCIs are designated as QCI-1, QCI-2, QCI-9, where QCI-1 through QCI-4 correspond to guaranteed bit rate for services such as conversational voice, live steaming, real time gaming, and buffered streaming; and QCI-5 through QCI-9 correspond to non-guaranteed bit rate for services such as IP multimedia signaling, buffered streaming, reliable data transport, and voice. Thus, each set of handover parameters may be keyed to a different QCI, as illustrated by the three lists and ellipses graphically linked to the parameter message 211-C in FIG. 2C. Each set of parameters could, again, be a distinct set of parameter values S, and A1-A5, as described above. Some (or all) of the values of like parameters in the two sets could be the same, but need not be. The main distinction is that the two or more sets are keyed to different QCIs.

In further accordance with example operation in this use case, the relay WCD 228, upon determining that the parameter message contains the two or more sets of handover threshold parameter values, each keyed to a different QCI, will not necessarily be able to make a definitive determination as to whether or not the serving base station 212-C can distinguish between relay WCDs and non-relay WCDs. Based on this lack of a definitive determination, the relay WCD 228 will carry out usual monitoring of signal strength, but will only report (transmit) a subset of possible events to the serving base station 212-C. In particular, the WCD 228 will omit from any signal-strength reports any events that could cause the serving base station 212-C to initiate or trigger a handover. The serving base station 212-C may thereby obtain and/or derive some useful information from any signal-strength reporting messages from the relay WCD 228, while it will not receive any event that would otherwise trigger a handover.

Non-triggering signal-strength information in a reporting message from a relay WCD that can be useful to operations of the serving base station include signal levels that can help the serving base station to intelligently and/or judiciously allocated resources. As one example, a serving base station may aggregate carriers from different frequency bands in order to increase available bandwidth for one or more WCDs being served. In so-called "carrier aggregation," the serving base station may initially allocate a primary carrier frequency and subsequently (or possibly contemporaneously) allocate one or more secondary frequencies for aggregation with the primary frequency. Transmissions may then utilize the total bandwidth of all allocated carriers. In selecting the secondary frequencies, the serving base station may take account of whether and how much interference may result from allocating and using the secondary carriers. Signal-strength information relating to neighboring base stations may help the serving base station's assessment of potential interference. Elimination all signal-strength reporting by relay WCD can thus deprive a serving base station of useful information. Thus, retaining at least some signal-strength reporting by relay WCDs for the example scenario illustrated in FIG. 2C helps ensure that all such useful information will not be forfeited.

Figure 3:
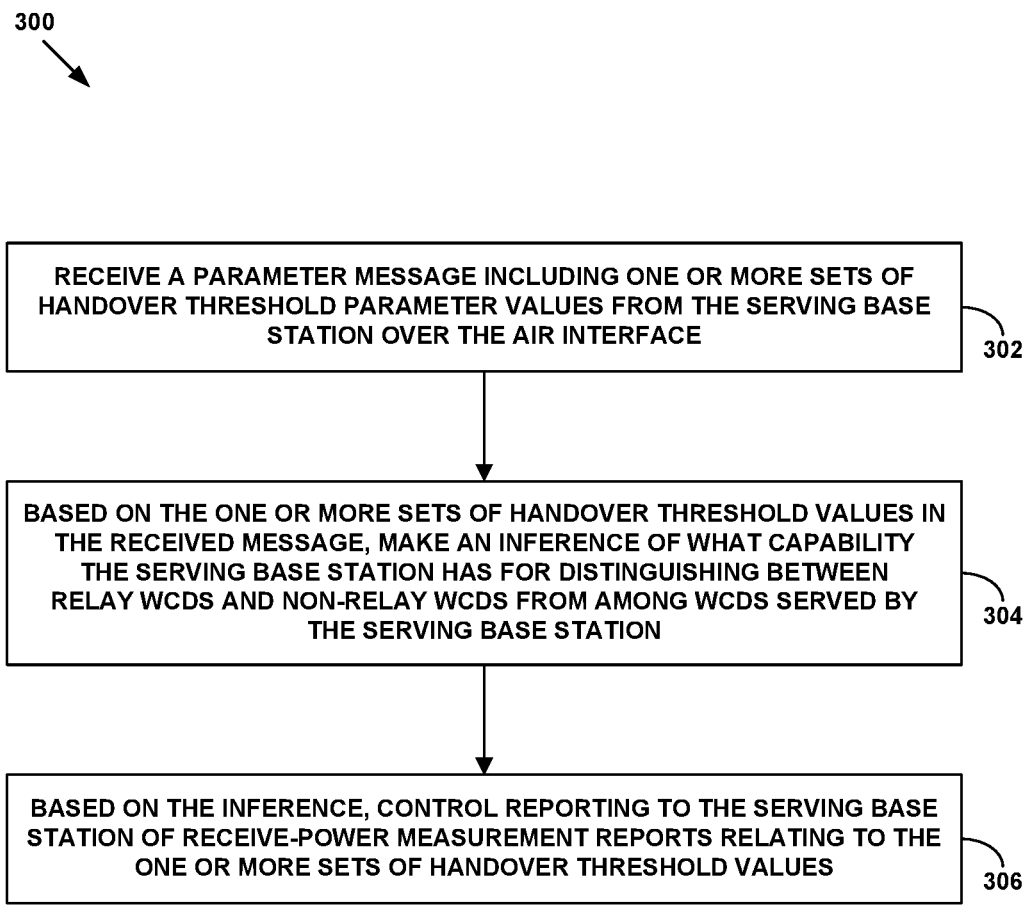
FIG. 3 is a flow chart of an example method in an example relay WCD, in accordance with example embodiments.

FIG. 3 is a flowchart illustrating a method 300, according to an example embodiment carried out by an example relay base station that includes a relay WCD. Illustrative methods, such as method 300, may be carried out in whole or in part by a relay base station that includes a relay WCD, such as by the relay base station 214 or shown in FIG. 2A, 2B, or 2C. The relay WCD, such as the relay WCD 228, may be receiving service from a serving base station, such as the serving base station 212-A, 212-B, or 212-C, of a wireless communication network, such as wireless network 200, over an air interface, such as the air interface 203. By way of example, the method 300 can be implemented as machine language instructions that can be stored on non-transitory machine-readable media (e.g, solid state memory, magnetic disk, etc.), and that when executed by one or more processors of a relay base station or its relay WCD to cause the relay WCD to carry out operations, steps, and/or functions of the method. In particular, the method 300 involves a method of disabling handover of a relay WCD by adapting signal-strength reporting of the relay WCD based on handover thresholds from its serving base station.

As shown by block 302 in FIG. 3, the method 300 entails the relay WCD receiving a parameter message that includes one or more sets of handover threshold parameter values from the serving base station over the air interface. In operation, the relay WCD may compare measurements of power received in reference signals from one or more base stations with one or more handover threshold values to determine if one or more conditions are met for sending receive-power measurement messages to the serving base station.

As shown by block 304 in FIG. 3, the method 300 next entails the relay WCD making an inference about serving base station based on the one or more sets of handover threshold values in the received message. More specifically, based on the one or more sets of handover threshold values, the relay WCD may infer what capability the serving base station has for distinguishing between relay WCDs and non-relay WCDs from among WCDs served by the serving base station.

As shown by block 306 in FIG. 3, method 300 next entails the relay WCD, based on the inference, controlling its reporting to the serving base station of receive-power measurement reports relating to the one or more sets of handover threshold values.

In accordance with example embodiments, each of the one more sets may include a respective plurality of threshold values. In one example use case, the inference may be made by the relay WCD that the serving base station lacks the capability. More particularly, making the inference that the serving base station lacks the capability for distinguishing between relay WCDs and non-relay WCDs from among WCDs served by the serving base station may entail determining that the parameter message from the serving base station includes just a single set of handover threshold parameter values. For this case, the relay WCD may control its reporting to the serving base station of receive-power measurement reports by refraining from transmitting to the serving base station any receive-power measurement reports relating to any of the one or more sets of handover threshold values.

In another example use case, the inference may be made by the relay WCD that the serving base station has the capability. More particularly, making the inference of what capability the serving base station has for distinguishing between relay WCDs and non-relay WCDs from among WCDs served by the serving base station may entail determining that the parameter message from the serving base station includes two or more sets of handover threshold parameter values, where each set is associated with a distinctly administered set of base stations within the wireless communication network. For this case, the relay WCD may control its reporting to the serving base station of receive-power measurement reports by transmitting to the serving base station one or more receive-power measurement reports each relating to any one or more of the respective plurality of threshold values of at least one of the one or more sets of handover threshold values.

Also in accordance with example embodiments, each distinctly administered set of base stations may be a public land mobile network (PLMN), and wherein at least one of the PLMNs is designated for relay WCDs.

In still one more example use case, the inference made by the relay WCD may be indeterminate as to whether or not the serving base station has the capability. More particularly, making the inference of what capability the serving base station has for distinguishing between relay WCDs and non-relay WCDs from among WCDs served by the serving base station may entail determining that the parameter message from the serving base station includes two or more sets of handover threshold parameter values, where each set is associated with a different quality of service specification. For this case, the relay WCD may control its reporting to the serving base station of receive-power measurement reports by transmitting to the serving base station one or more receive-power measurement reports each relating to only a specific subset of the one or more of the respective plurality of threshold values of at least one of the one or more sets of handover threshold values.

Also in accordance with example embodiments, each different quality of service specification may be a quality of service class indicator (QCI).

In accordance with example embodiments, the wireless communication network may be configured to operate according to at least Long Term Evolution (LTE), and each of the one or more sets of handover threshold parameter values may be a set of A-thresholds for determining if one or more handover conditions for the relay WCD are met. Making the inference of what capability the serving base station has for distinguishing between relay WCDs and non-relay WCDs from among WCDs served by the serving base station may the entail making one of three determinations. More specifically, the three determination may be: (i) that the received parameter message includes just a single set A-thresholds; (ii) that the received parameter message includes a plurality of sets of A-thresholds, where each set is associated with a distinct PLMN, and where at least one of the PLMNs is designated for relay WCDs; or (iii) that the received parameter message includes a plurality of sets of A-thresholds, where each set is associated with a different QCI. The relay WCD may then control its reporting to the serving base station of receive-power measurement reports according to one of three controlling actions. Namely, the relay WCD may: (i) refrain from sending any intra-band measurements reports to the serving base station, if the received parameter message includes just a single set of A-thresholds; (ii) send to the serving base station intra-band measurements reports for any one or more of the A-thresholds of a particular set of A-thresholds relating to a PLMN designated for relay WCDs, if the received parameter message includes the particular set among a plurality of sets of A-thresholds; or (iii) send to the serving base station intra-band measurements reports only for a A-thresholds that do not trigger handovers, if the received parameter message includes a plurality of sets of A-thresholds, where each set is associated with a different QCI. Herein, an intra-band measurement report is a form of power-receive measurement report or received signal-strength measurement report.

Figure 4:
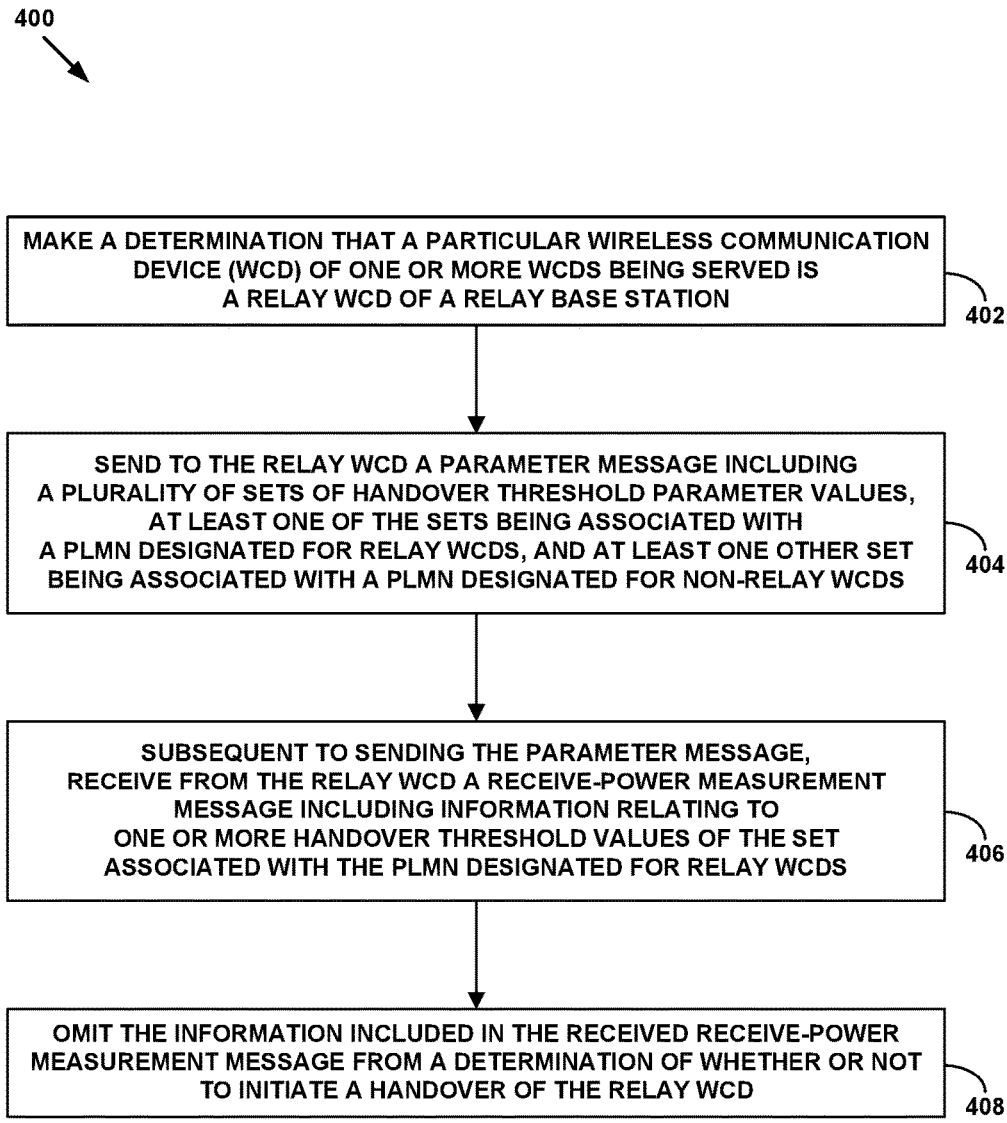
FIG. 4 is a flow chart of an example method in an example base station, in accordance with example embodiments.

FIG. 4 is a flowchart illustrating a method 400, according to an example embodiment. Illustrative methods, such as method 400, may be carried out in whole or in part by a base station, such as by the base station 212-B or shown in FIG. 2. By way of example, the method 400 can be implemented as machine language instructions that can be stored on non-transitory machine-readable media (e.g, solid state memory, magnetic disk, etc.), and that when executed by one or more processors of a base station to cause the base station to carry out operations, steps, and/or functions of the method. In particular, the method 400 involves a method of disabling handover of a relay WCD by adapting signal-strength reporting of the relay WCD based on handover thresholds from its serving base station.

As shown by block 402 in FIG. 4, the method 400 entails making a determination that a particular wireless communication device (WCD) of one or more WCDs being served by the base station is a relay WCD of a relay base station.

As shown by block 404 in FIG. 4, the method 400 next entails, based on the determination, sending to the relay WCD a parameter message including a plurality of sets of handover threshold parameter values, where at least one of the sets is associated with a PLMN designated for relay WCDs, and at least one other set is associated with a PLMN designated for non-relay WCDs. As described above, the handover threshold values are used by WCDs to determine if one or more conditions are met for sending receive-power measurement messages to their respective serving base station.

As shown by block 406 in FIG. 4, method 400 next entails, subsequent to sending the parameter message, receiving a receive-power measurement message from the relay WCD, where the receive-power measurement message includes information comparing power received by the relay WCD from one or more base stations with one or more handover threshold values of the set associated with the PLMN designated for relay WCDs.

As shown by block 408 in FIG. 4, method 400 next entails, omitting the information included in the received receive-power measurement message from a determination of whether or not to initiate a handover of the relay WCD. That is, the base station recognizes that the relay WCD used the one or more handover threshold values of the set associated with the PLMN designated for relay WCDs in its signal strength reporting. Based on this determination, the base station may ignore or disregard any handover trigger that might otherwise apply to the relay base station.

In accordance with example embodiments, the wireless communication network may be configured to operate according to at least Long Term Evolution (LTE), and each of the plurality of sets of handover threshold parameter values may be a set of A-thresholds for determining if one or more handover conditions for the relay WCD are met. Omitting the information included in the received receive-power measurement message from a determination of whether or not to initiate a handover of the relay WCD may then entail disregarding for the purposes of handover any A-threshold comparison that otherwise indicates a handover condition is met.

In accordance with example embodiments, the method 400 may further entail the base station selecting a secondary carrier frequency for carrier aggregation based on information included in the received receive-power measurement message other than any A-threshold comparison that indicates a handover condition is met.

It will be appreciated that the example methods 300 and 400 could include alternate and/or additional steps, while still remaining within the scope and spirit of example embodiments herein.

Figure 5:
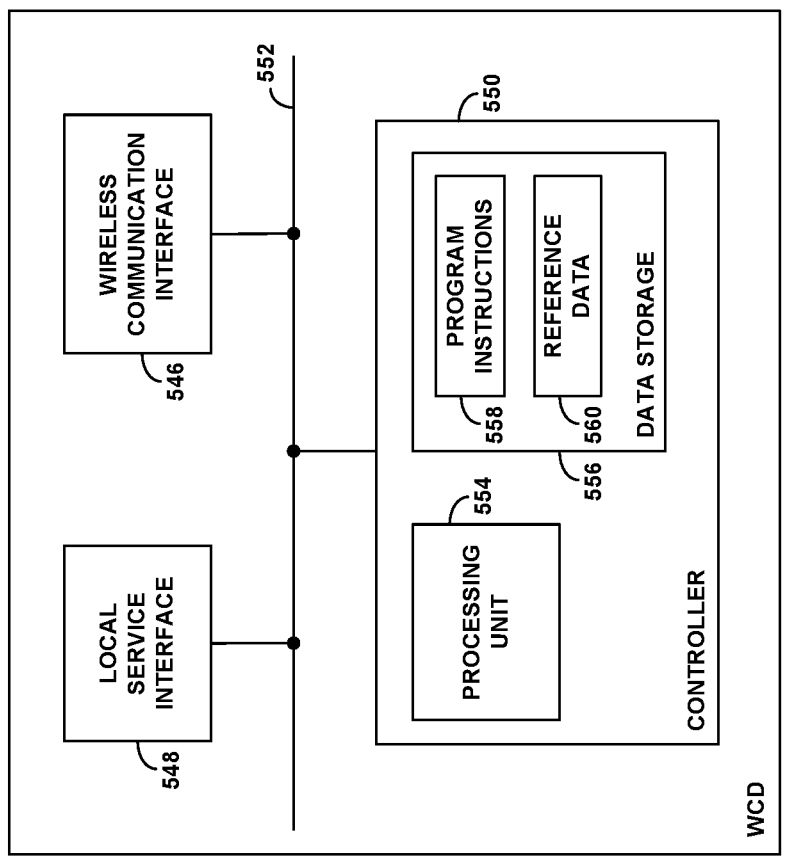
FIG. 5 is simplified block diagram of an example WCD operable in accordance with example embodiments.

FIG. 5 is next a simplified block diagram of a WCD, showing some of the components that such a device could include in accordance with an example implementation. In particular, the example WCD may be configured to provide connectivity between at least one other device and the base station. Such a WCD could be a relay WCD, such as relay WCD 228, or a hotspot/D2D node for instance.

As shown in FIG. 5, the example WCD includes a wireless communication interface 546, local service interface 548, and a controller 550, all of which could be coupled together or otherwise interconnected by a system bus, network, or other connection mechanism 552. Further, these or other components of the WCD could be integrated together in various ways. For instance, the controller could be provided as logic on a chipset that also serves as at least part of the wireless communication interface or local service interface. And the wireless communication interface and local service interface could be combined together. Further, the WCD could include other components and take other forms. For instance, if the WCD is user operated, the WCD could include a user interface. Other examples are possible as well.

In the example WCD, the wireless communication interface 546 could be configured to engage in wireless communication with the base station that serves the WCD, via a wireless channel between the WCD and the base station. As such, the wireless communication interface could include a radio compliant with the protocol that the WCD will use for communication with the base station, such as LTE for instance, and could further include an antenna structure for transmitting and receiving via the wireless channel.

The local service interface 548 could then be configured to engage in communication directly or indirectly with one or more other devices. For example, the local interface could be configured to communicate with a small cell base station that in turn serves one or more other devices, and/or the local interface could be configured to communicate more directly with one or more other devices. Further, the local service interface could provide for wired and/or wireless communication with the one or more other devices. For instance, the local service interface could include a wireless communication interface that operates to communicate with one or more other entities over the same air interface protocol used by wireless communication interface 546 or over a different air interface protocol. (By way of example, the wireless communication interface 546 could communicate with the serving base station according to LTE, and the local service interface 548 could communicate with other devices using LTE or using WiFi.) Alternatively, the local service interface could be configured for connection with a wired link such as an Ethernet connection or other cable connection with one or more other entities.

With these interfaces, the WCD could operate to be served by, and thus communicate data to and from, its serving base station on the one hand and to communicate data to and from one or more other devices on the other hand. Thus, the WCD could function as an intermediary providing connectivity between the one or more other devices and the base station.

The controller 550, in turn, could be configured to control operation of the WCD including implementing various WCD operations described herein.

As shown by way of example, the controller could include a processing unit 554 and data storage 556. Processing unit 554 could comprise one or more general purpose processors (e.g., microprocessors) and/or one or more special-purpose processors (e.g., application specific integrated circuits or digital signal processors). And data storage 556 could comprise one or more non-transitory volatile and/or non-volatile storage components, such as magnetic, optical, or flash memory, and could hold or be encoded with program instructions 558 and reference data 560. Program instructions 558 could be executable by processing unit 554 to carry out various WCD operations described herein. And reference data 560 could include various data to facilitate carrying out the operations, such as data indicating the extent to which the WCD provides connectivity between its serving base station and one or more other devices, and mapping data that correlates various channel state reporting rates with particular extents to which the WCD provides connectivity between its serving base station and one or more other devices.

Figure 6:
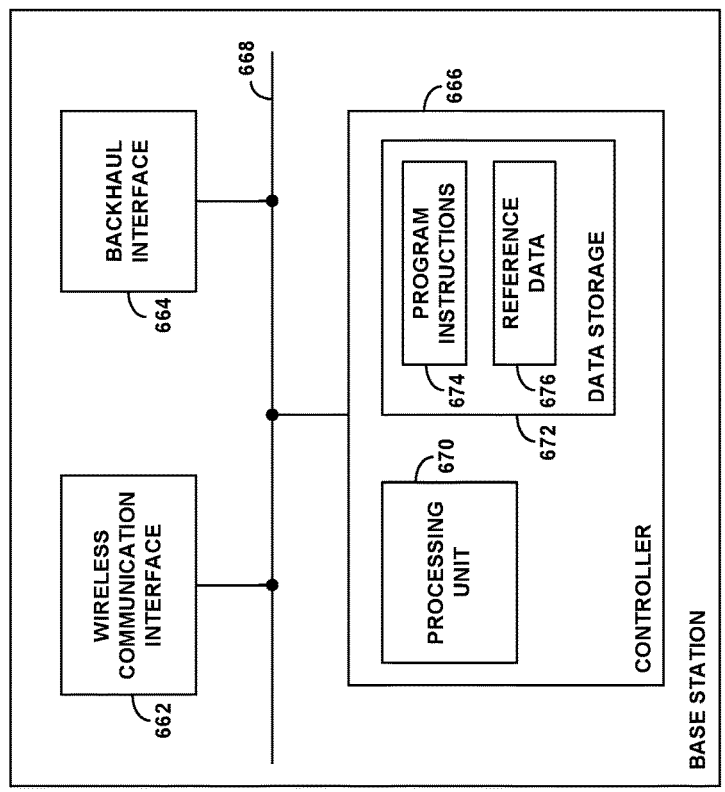
FIG. 6 is simplified block diagram of an example base station operable in accordance with example embodiments.

FIG. 6 is next a simplified block diagram of a base station (such as base stations 112 or 212-B, for example), showing some of the components that such an entity could include in accordance with an example implementation. In particular, the example base station is configured to act as a serving base station for a WCD, carry out steps to send a parameter message to the WCD, and to ignore possible handover triggers if the WCD is a relay WCD, as described above. The example base station could be a macro base station of the type that typically includes a tower top antenna structure and provides a broad range of coverage, or the base station could be a small cell base station (e.g., femtocell, mini-macro, or the like) that typically has a smaller form factor and provides a narrower range of coverage. Under LTE, the base station could be an eNodeB. Under other protocols, the base station could take other forms.

As shown in FIG. 6, the example base station includes a wireless communication interface 662, a backhaul interface 664, and a controller 666, all of which could be coupled together or otherwise interconnected by a system bus, network, or other connection mechanism 668. Further, these or other components of the base station could be integrated together in various ways.

In the example base station, the wireless communication interface 646 could be configured to engage in wireless communication with a served WCD via a wireless channel between the base station and the WCD. As such, the wireless communication interface could include a radio compliant with the protocol that the base station will use for communication with the WCD station, such as LTE for instance, and could further include an antenna structure for transmitting and receiving via the wireless channel. The backhaul interface 664 may then be a wired or wireless interface for communicating with various core network entities, such as with an SGW and MME as discussed above for instance.

The controller 666, in turn, could be configured to control operation of the base station including implementing various base station operations described herein, such as to sending a parameter message to a WCD, and to ignoring possible handover triggers if the WCD is a relay WCD, as described above.

As shown by way of example, the controller 666 could include a processing unit 670 and data storage 672. Processing unit 670 could comprise one or more general purpose processors (e.g., microprocessors) and/or one or more special-purpose processors (e.g., application specific integrated circuits or digital signal processors). And data storage 672 could comprise one or more non-transitory volatile and/or non-volatile storage components, such as magnetic, optical, or flash memory, and could hold or be encoded with program instructions 674 and reference data 676. Program instructions 674 could be executable by processing unit 670 to carry out various base station operations described herein. And reference data 676 could include various data to facilitate carrying out the operations, such as those described above.

Exemplary embodiments have been described above. Those skilled in the art will understand, however, that changes and modifications may be made to these embodiments without departing from the true scope and spirit of the invention.

What is claimed is:

1. In a relay base station comprising a relay wireless communication device (WCD) receiving service from a serving base station of a wireless communication network over an air interface, a method comprising:

the relay WCD receiving a parameter message including one or more sets of handover threshold parameter values from the serving base station over the air interface, wherein the relay WCD compares measurements of power received in reference signals from one or more base stations with one or more handover threshold values to determine if one or more conditions are met for sending receive-power measurement messages to the serving base station;

based on the one or more sets of handover threshold values in the received message, the relay WCD making an inference of what capability the serving base station has for distinguishing between relay WCDs and non-relay WCDs from among WCDs served by the serving base station; and based on the inference, the relay WCD controlling its reporting to the serving base station of receive-power measurement reports relating to the one or more sets of handover threshold values.

2. The method of claim 1, wherein each of the one more sets comprises a respective plurality of threshold values, wherein the inference made is that the serving base station lacks the capability, and wherein the relay WCD controlling its reporting to the serving base station of receive-power measurement reports relating to the one or more sets of handover threshold values comprises the relay WCD refraining from transmitting to the serving base station any receive-power measurement reports relating to any of the one or more sets of handover threshold values.

3. The method of claim 1, wherein each of the one more sets comprises a respective plurality of threshold values, wherein the inference made is that the serving base station has the capability, and wherein the relay WCD controlling its reporting to the serving base station of receive-power measurement reports relating to the one or more sets of handover threshold values comprises the relay WCD transmitting to the serving base station one or more receive-power measurement reports each relating to any one or more of the respective plurality of threshold values of at least one of the one or more sets of handover threshold values.

4. The method of claim 1, wherein each of the one more sets comprises a respective plurality of threshold values, wherein the inference made is indeterminate as to whether or not the serving base station has the capability, and wherein the relay WCD controlling its reporting to the serving base station of receive-power measurement reports relating to the one or more sets of handover threshold values comprises the relay WCD transmitting to the serving base station one or more receive-power measurement reports each relating to only a specific subset of the one or more of the respective plurality of threshold values of at least one of the one or more sets of handover threshold values.

5. The method of claim 2, wherein making the inference of what capability the serving base station has for distinguishing between relay WCDs and non-relay WCDs from among WCDs served by the serving base station comprises determining that the parameter message from the serving base station includes just a single set of handover threshold parameter values.

6. The method of claim 3, wherein making the inference of what capability the serving base station has for distinguishing between relay WCDs and non-relay WCDs from among WCDs served by the serving base station comprises determining that the parameter message from the serving base station includes two or more sets of handover threshold parameter values, each set being associated with a distinctly administered set of base stations within the wireless communication network.

7. The method of claim 4, wherein making the inference of what capability the serving base station has for distinguishing between relay WCDs and non-relay WCDs from among WCDs served by the serving base station comprises determining that the parameter message from the serving base station includes two or more sets of handover threshold parameter values, each set being associated with a different quality of service specification.

8. The method of claim 6, wherein each distinctly administered set of base stations is a public land mobile network (PLMN), and wherein at least one of the PLMNs is designated for relay WCDs.

9. The method of claim 7, wherein each different quality of service specification is a quality of service class indicator.

10. The method of claim 1, wherein the wireless communication network is configured to operate according to at least Long Term Evolution (LTE), wherein each of the one or more sets of handover threshold parameter values is a set of A-thresholds for determining if one or more handover conditions for the relay WCD are met, wherein making the inference of what capability the serving base station has for distinguishing between relay WCDs and non-relay WCDs from among WCDs served by the serving base station comprises making one of three determinations, the three determination being: (i) that the received parameter message includes just a single set A-thresholds, (ii) that the received parameter message includes a plurality of sets of A-thresholds, each set being associated with a distinct public land mobile network (PLMN), wherein at least one of the PLMNs is designated for relay WCDs, or (iii) that the received parameter message includes a plurality of sets of A-thresholds, each set being associated with a different quality of service class indicator (QCI), and wherein the relay WCD controlling its reporting to the serving base station of receive-power measurement reports relating to the one or more sets of handover threshold values comprises the WCD carrying out one of three controlling actions, the three controlling actions being: (i) refraining from sending any intra-band measurements reports to the serving base station, if the received parameter message includes just a single set of A-thresholds, (ii) sending to the serving base station intra-band measurements reports for any one or more of the A-thresholds of a particular set of A-thresholds relating to a PLMN designated for relay WCDs, if the received parameter message includes the particular set among a plurality of sets of A-thresholds, or (iii) sending to the serving base station intra-band measurements reports only for a A-thresholds that do not trigger handovers, if the received parameter message includes a plurality of sets of A-thresholds, each set being associated with a different QCI.

11. A relay base station comprising a relay wireless communication device (WCD) for receiving service from a serving base station of a wireless communication network over an air interface, the relay wireless communication device WCD comprising:

an air interface for wireless communications with one or more base stations;

one or more processors;
memory accessible by the one or more processors; and
machine-readable instructions stored in the memory, that upon execution by the one or more processors cause the relay WCD to carry out operations including:
receiving a parameter message including one or more sets of handover threshold parameter values from the serving base station over the air interface, wherein the relay WCD compares measurements of power received in reference signals from one or more base stations with one or more handover threshold values to determine if one or more conditions are met for sending receive-power measurement messages to the serving base station,
based on the one or more sets of handover threshold values in the received message, making an inference of what capability the serving base station has for distinguishing between relay WCDs and non-relay WCDs from among WCDs served by the serving base station, and
based on the inference, controlling reporting to the serving base station of receive-power measurement reports relating to the one or more sets of handover threshold values.

12. The relay base station of claim 11, wherein each of the one more sets comprises a respective plurality of threshold values,
wherein the inference made is that the serving base station lacks the capability,
and wherein controlling reporting to the serving base station of receive-power measurement reports relating to the one or more sets of handover threshold values comprises refraining from transmitting to the serving base station any receive-power measurement reports relating to any of the one or more sets of handover threshold values.

13. The relay base station of claim 11, wherein each of the one more sets comprises a respective plurality of threshold values,
wherein the inference made is that the serving base station has the capability,
and wherein controlling reporting to the serving base station of receive-power measurement reports relating to the one or more sets of handover threshold values comprises transmitting to the serving base station one or more receive-power measurement reports each relating to any one or more of the respective plurality of threshold values of at least one of the one or more sets of handover threshold values.

14. The relay base station of claim 11, wherein each of the one more sets comprises a respective plurality of threshold values,
wherein the inference made is indeterminate as to whether or not the serving base station has the capability,
and wherein controlling reporting to the serving base station of receive-power measurement reports relating to the one or more sets of handover threshold values comprises transmitting to the serving base station one or more receive-power measurement reports each relating to only a specific subset of the one or more of the respective plurality of threshold values of at least one of the one or more sets of handover threshold values.

15. The relay base station of claim 12, wherein making the inference of what capability the serving base station has for distinguishing between relay WCDs and non-relay WCDs from among WCDs served by the serving base station comprises determining that the parameter message from the serving base station includes just a single set of handover threshold parameter values.

16. The relay base station of claim 13, wherein making the inference of what capability the serving base station has for distinguishing between relay WCDs and non-relay WCDs from among WCDs served by the serving base station comprises determining that the parameter message from the serving base station includes two or more sets of handover threshold parameter values, each set being associated with a distinctly administered set of base stations within the wireless communication network,
wherein each distinctly administered set of base stations is a public land mobile network (PLMN), and wherein at least one of the PLMNs is designated for relay WCDs.

17. The relay base station of claim 14, wherein making the inference of what capability the serving base station has for distinguishing between relay WCDs and non-relay WCDs from among WCDs served by the serving base station comprises determining that the parameter message from the serving base station includes two or more sets of handover threshold parameter values, each set being associated with a different quality of service specification,
wherein each different quality of service specification is a quality of service class indicator.

18. In a base station of a wireless communication network, a method comprising:
making a determination that a particular wireless communication device (WCD) of one or more WCDs being served by the base station is a relay WCD of a relay base station;
based on the determination, sending to the relay WCD a parameter message including a plurality of sets of handover threshold parameter values, at least one of the sets being associated with a public land mobile network (PLMN) designated for relay WCDs, and at least one other set being associated with a PLMN designated for non-relay WCDs, wherein handover threshold values are used by WCDs to determine if one or more conditions are met for sending receive-power measurement messages to their respective serving base station;
subsequent to sending the parameter message, receiving a receive-power measurement message from the relay WCD, the receive-power measurement message including information comparing power received by the relay WCD from one or more base stations with one or more handover threshold values of the set associated with the PLMN designated for relay WCDs; and
omitting the information included in the received receive-power measurement message from a determination of whether or not to initiate a handover of the relay WCD.

19. The base station of claim 18, wherein the wireless communication network is configured to operate according to at least Long Term Evolution (LTE),
wherein each of the plurality of sets of handover threshold parameter values is a set of A-thresholds for determining if one or more handover conditions for the relay WCD are met,
and wherein omitting the information included in the received receive-power measurement message from a determination of whether or not to initiate a handover of the relay WCD comprises disregarding any A-threshold comparison that indicates a handover condition is met.

20. The base station of claim 19, further comprising selecting a secondary carrier frequency for carrier aggregation based on information included in the received receive-power measurement message other than any A-threshold comparison that indicates a handover condition is met.

\* \* \* \* \*